United States Patent
Yang et al.

(10) Patent No.: US 9,948,741 B2
(45) Date of Patent: Apr. 17, 2018

(54) DISTRIBUTED HEALTH-CHECK METHOD FOR WEB CACHING IN A TELECOMMUNICATION NETWORK

(71) Applicant: TELEFONICA, S.A., Madrid (ES)

(72) Inventors: Xiaoyuan Yang, Madrid (ES); Martin Ivan Levi, Madrid (ES); Eguzki Astiz Lezaun, Madrid (ES); Armando Antonio Garcia Sanchez Mendoza, Madrid (ES); David Guijarro Guillen, Madrid (ES); Arcadio Pando Cao, Madrid (ES); Maite Burrel, Madrid (ES); David Conejero Olesti, Madrid (ES)

(73) Assignee: Telefonica, S.A., Madrid (ES)

( * ) Notice: Subject to any disclaimer, the term of this patent is extended or adjusted under 35 U.S.C. 154(b) by 249 days.

(21) Appl. No.: 14/652,202

(22) PCT Filed: Dec. 10, 2013

(86) PCT No.: PCT/EP2013/076135
§ 371 (c)(1),
(2) Date: Jun. 15, 2015

(87) PCT Pub. No.: WO2014/095501
PCT Pub. Date: Jun. 26, 2014

(65) Prior Publication Data
US 2016/0191646 A1 Jun. 30, 2016

(30) Foreign Application Priority Data

Dec. 19, 2012 (EP) .................................... 12382515

(51) Int. Cl.
*G06F 15/167* (2006.01)
*H04L 29/08* (2006.01)
(Continued)

(52) U.S. Cl.
CPC .... *H04L 67/2842* (2013.01); *G06F 17/30902* (2013.01); *H04L 41/0893* (2013.01);
(Continued)

(58) Field of Classification Search
USPC ................................. 709/213, 202, 223, 224
See application file for complete search history.

(56) References Cited

U.S. PATENT DOCUMENTS

2001/0049732 A1 12/2001 Raciborski et al.
2008/0071925 A1 3/2008 Leighton et al.
(Continued)

FOREIGN PATENT DOCUMENTS

WO 03/098464 A1 11/2003
WO 2012/152824 A1 11/2012

OTHER PUBLICATIONS

International Search Report of PCT/EP2013/076135, dated Feb. 12, 2014. [PCT/ISA/210].

*Primary Examiner* — Lan-Dai T Truong
(74) *Attorney, Agent, or Firm* — Sughrue Mion, PLLC

(57) ABSTRACT

A distributed health-check method for web caching in a telecommunication network, wherein a plurality of web caching nodes are coordinated to monitor a set of origin servers where web content is generated. The method includes associating to each user of the telecommunication network requesting the web content buckets as logical containers for holding the web content requested; generating a list of users of the telecommunication network requesting the web content; and performing the plurality of web caching nodes a number of health-checks to the set of origin servers to download the requested web content. A filtering of the set of origin servers is performed for grouping in different areas of interest and the number of health-checks are performed by a limited number of caching nodes receiving the web content requests. The limited number of caching (Continued)

nodes selected belonging to a specific area of interest of the set of origin servers monitoring them.

16 Claims, 4 Drawing Sheets

(51) Int. Cl.
    *G06F 17/30*     (2006.01)
    *H04L 12/24*     (2006.01)
    *H04L 12/26*     (2006.01)

(52) U.S. Cl.
    CPC .............. *H04L 43/10* (2013.01); *H04L 67/22* (2013.01); *H04L 67/322* (2013.01)

(56) References Cited

U.S. PATENT DOCUMENTS

| | | |
|---|---|---|
| 2010/0121932 A1 | 5/2010 | Joshi et al. |
| 2011/0082982 A1 | 4/2011 | Harvell et al. |
| 2012/0185557 A1 | 7/2012 | Di Marco et al. |

DISTRIBUTED HEALTH-CHECK METHOD FOR WEB CACHING IN A TELECOMMUNICATION NETWORK

CROSS REFERENCE TO RELATED APPLICATIONS

This application is a National Stage of International Application No. PCT/EP2013/076135 filed Dec. 10, 2013, claiming priority based on European Patent Application No. 12382515.0, filed Dec. 19, 2012, the contents of all of which are incorporated herein by reference in their entirety.

FIELD OF THE ART

The present invention generally relates to web caching, and more particularly to a distributed health-check method for web caching in a telecommunication network.

PRIOR STATE OF THE ART

Web caching is a multi-tenant system where different content providers subscribe and share resources from a pool of distributed machines at the edge of a network. There are different mechanisms developed in each web-caching machine to provide the subscription and fair resource sharing. One of the key mechanisms is the health-check system where each machine tracks the origin-servers where all web-content is initially generated.

The health-check system is essential for the well-functioning of any web-caching system. In order to provide web-caching service, each caching node needs real-time information about the origin-servers. For instance, caching nodes may need to deliver expired contents, in case of not being able to contact with the origin-servers. In case of existing several origin-servers, caching nodes may need network information to select the best candidate. Two related patents in this field are patent WO 2003/098464 disclosing an 'Enterprise Content Delivery Network Having a Central Controller for Coordinating a Set of Content Servers' and patent US 2008/0071925 disclosing a 'Global load balancing across mirrored data centers'.

The most trivial health-check system design relies on periodical gossip network messages to origin-servers where delay information is recollected. Different message lose schemes as the one disclosed in [1] could be defined to detect when an origin-server is down. For instance, a scheme could consider an origin-server failure when n successive gossip messages have lost. Other schemes, for instance the one in [2], consider that an origin-server is down, when more than m caching nodes detect the same situation.

Designing a scalable health-check mechanism in web-caching system is, however, not trivial. The multi-tenant nature of a web-caching system significantly increases the number of nodes to be monitored. In daily operation of a Content Distribution Network (CDN), it may typically handle more than 10k customers at same time with tens of origin-servers per customer. Monitoring all customers at same time in each caching nodes is just prohibitive. A CDN service provider may deploy thousands of caching nodes. Allowing all nodes to monitor an origin-server is not effective, since the origin-server may have to handle huge monitoring traffic.

This invention is about a distributed health-check method and system for web caching in a multi-tenant environment, such as a CDN, where each caching node cannot effectively monitor all origin-servers due to huge number of origins and caching node.

The invention is not about how to do caching node selection based on health-check results, such as part of the proposal of patent application WO 2003/098464. It neither proposes a new way to perform each health-check, as part of claims in US 2008/0071925. The invention is related to solve a new problem that appears in multi-tenant environment where number of health-checks is huge and performing health-checks to all origin-servers from all caching node is unfeasible.

In this sense, the goal is to minimize the total number of health-checks at same time maximizing the amount of information that each health-check can provide.

REFERENCES

[1] Xavier Defago, Peter Urban, Naohiro Hayashibara, and Takuya Katayama. The pHi accrual failure detector. In RR IS-RR-2004-010, Japan Advanced Institute of Science and Technology, pages 66-78, 2004.

[2] Rajagopal Subramaniyan, Pirabhu Raman, Alan D. George and Matthew Radlinski. GEMS: Gossip-Enabled Monitoring Service for Scalable Heterogeneous Distributed Systems, Cluster Computing 9, 101-120, 2006

SUMMARY OF THE INVENTION

The invention in order to achieve the mentioned goals uses a set of mechanisms or already patented methods, defined by the same inventors of this application, including the following design aspects.

A first aspect of the present invention relates, as commonly in the field, to a distributed health-check method for web caching in a telecommunication network, wherein a plurality of web caching nodes are coordinated to monitor a set of origin servers where web content is generated, the method comprising:

a) associating to each user of said telecommunication network requesting said web content buckets as logical containers for holding said web content requested;

b) generating a list containing all of said users of the telecommunication network requesting said web content; and c) performing by each one of said plurality of web caching nodes a number of health-checks to said set of origin servers to download said requested web content. On contrary to the known proposals, the method comprises:

filtering said set of origin servers so that they are grouped in different areas of interest; and performing said step c) by a limited number of web caching nodes of said plurality of web caching nodes, said limited number of web caching nodes being selected belonging to a specific area of interest from said different areas of interest where the set of origin servers have been grouped.

All web-caching nodes are coordinated to monitor origin-servers, this origin-servers grouped in different areas-of-interest. By an Area-of-interest of an origin-server it is defined the location of the end-users, or customers, of the content generated by the origin-server. For instance, given an origin-server with its list of areas-of-interest, only the caching nodes (active-monitoring nodes) in those areas will be in charge of monitoring the origin-server.

According to an embodiment, said filtering is performed based on geographical information of said users of the telecommunication network and on the demand of said users of the telecommunication network. Preferably, the exit of the first filter, based on geographical information, is used as an initial list of origin servers to perform the health-check. Usually, those two filters work at the same time, in the sense that an origin-server which has not been obtained from the first filter, can enter the system if a petition or demand, is received.

The result of monitoring from different active-monitoring nodes is propagated or shared to all the rest of CDN nodes. In the information propagation, each caching node represents the state of all origin-servers using a bloom filter with a finite number of bits (as the one used in document "*The Art of Computer Programming*" D. Knuth). For the information sharing, all web-caching nodes are organized in a random overlay mesh network.

According to another embodiment, the method also checks if a user has been already tracked by said limited number of caching nodes. Although the track timer is configurable, the system preferably tracks said user periodically every 50 seconds and usually a limited period of time.

The Monitoring Action Scheduling module computes, according to another embodiment, the monitoring time period of said filtered set of origin servers and also the next monitoring actions to be performed on said filtered set of origin servers. The monitoring time period is computed by using information regarding a health-stability rate (hSR) value and information regarding the ratio of downloaded web content of each of said filtered set of origin servers.

Tenant health trend is predicted using both local and global information. The local information is based on the result of active checks. Global information is collected from other nodes. Each active-monitoring node constantly evaluates the tenant healthy trend and concentrates the monitoring effort on those nodes that are healthily unstable.

The hSR value is calculated by a Tenant Health-Trend Prediction module using information regarding said filtered set of origin servers and/or information collected from other plurality of caching nodes.

Not all origin-servers have the same importance in web-caching service. For instance, the healthiness of an origin-server for static contents (images or css files) only has impact in the web-caching service in the initial caching warm-up stage. The invention design includes a healthiness impact evaluation module that calculates the importance of an origin-server in the global web-caching service. The evaluation will guide the monitoring resources and those nodes that do not affect the web-caching service will be not monitored.

Then, according to another embodiment a Healthiness Impact Guiding module continuously evaluates the information regarding the downloaded web content ratio.

Preferably the next monitoring actions are performed on said filtered set of origin servers that are not already monitored and/or on said filtered set of origin servers that the time passed from the last monitoring is higher than said monitoring time period.

According to yet another embodiment, all the monitoring actions can be shared, by a Monitoring Result Sharing module, at least to some of the caching nodes located near said limited number of caching nodes in said telecommunication network or on contrary to all of them if it is required. Said caching nodes and said limited number of caching nodes connected in said random overlay mesh network are coordinated by means of a centralized tracker.

Finally, the telecommunication network used in the present invention is at least a content delivery network or CDN.

BRIEF DESCRIPTION OF THE DRAWINGS

The previous and other advantages and features will be more fully understood from the following detailed description of embodiments, with reference to the attached, which must be considered in an illustrative and non-limiting manner, in which.

DETAILED DESCRIPTION OF SEVERAL EMBODIMENTS

Figure 1:
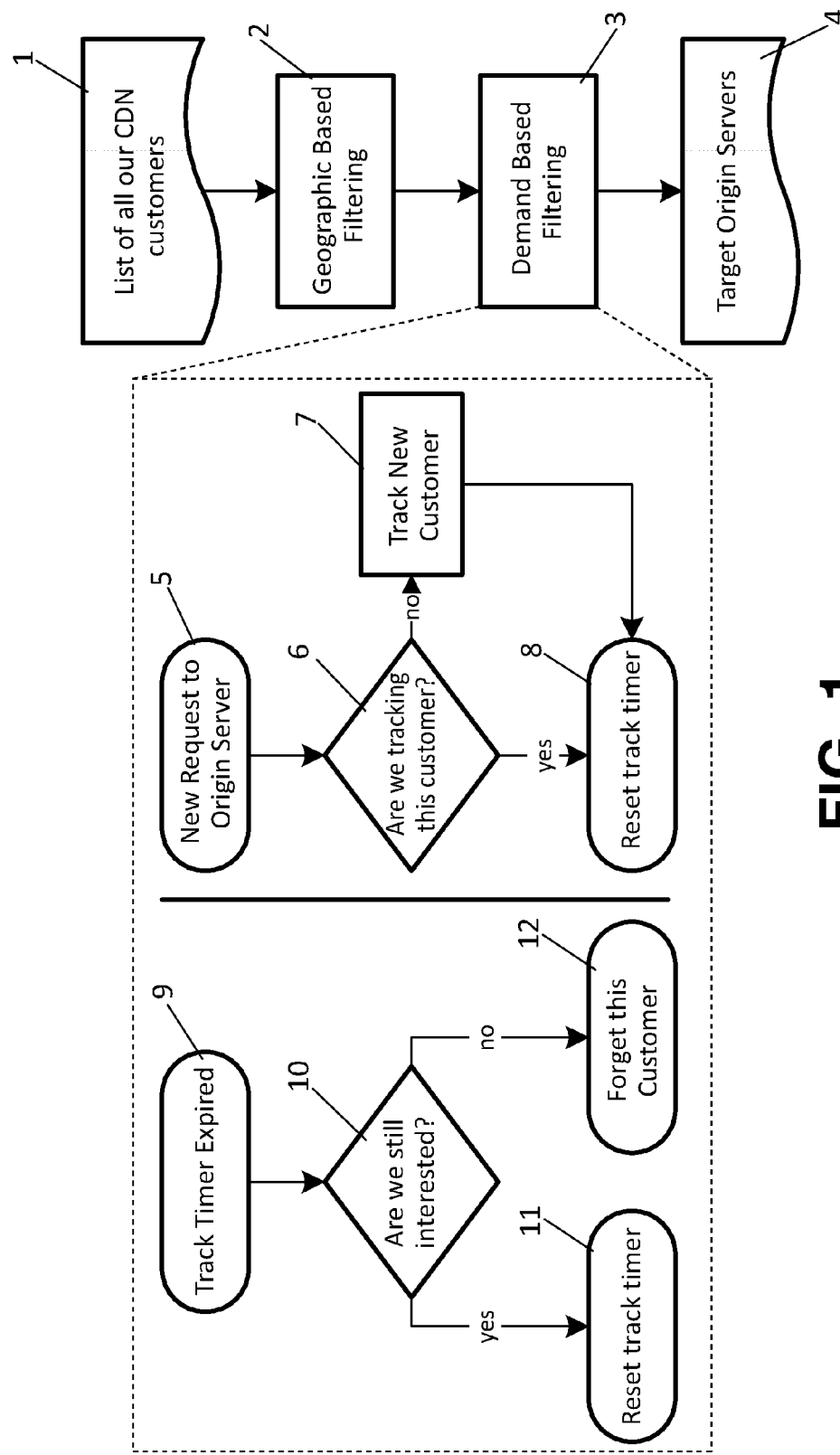
FIG. 1 is the proposed multi-tenant health-check system used in the present invention.

FIG. 1 shows an embodiment of the proposed multi-tenant healthy-check system. In the system, for each customer, a set of origin servers are configured in the CDN control center. In the patent application WO 2012/152767 'A Method for Content Delivery in a Content Distribution Network' the mechanism that is used to define each customer is already defined. According to WO 2012/152767, each customer is associated with a logical entity, called bucket. The list of buckets, thus, is the input of the present invention health-check system.

A bucket is a logical entity or container for a customer that holds the CDN customer's content in the form of a list of geographic areas. A bucket either makes a link between origin server URL and CDN URL or it may contain the content itself (that is uploaded into the bucket at the entry point). An end point will replicate files from the origin server to files in the bucket. Each file in a bucket may be mapped to exactly one file in the origin server.

The initial customer list (1) is then filtered by the Area-of-Interest Filtering module (AOIF). Given an area of interest, the CDN redirection mechanism, this redirection mechanism was already defined in WO 2012/152765 'A Method for DNS Resolution of Content Requests in a CDN Service' and in WO 2012/152824 'Method for managing the infrastructure of a Content Distribution Network service in an ISP network and such an infrastructure' direct all end-users' requests to a set of specific cache nodes. Filtering origin-servers by area-of-interest allow focusing its health-check actions to those that are really interesting for the invention service.

For all those origin-servers that the caching-node is interested (3), module (4) (Monitoring Action Scheduling, MAS) calculate the monitoring period. The module (4) will use information from Healthy Tread Prediction (HTP) (6) and Healthiness-impact Evaluation (HIE) modules (7) to calculate the monitoring period. The main idea is to focus the monitoring effort to those origin that are healthily unstable that strongly effect the service level. As result of MAS, a list of monitoring actions is generated in (5).

Monitoring Engine (ME) (9) executes the monitoring action and Monitoring Result Sharing (MRS) (11) propagates all monitoring results (10) to others caching nodes through network (12).

The health-check modules provide information to all other modules of web caching system, and use delivery stats from web-caching delivery modules (8) to evaluate healthiness-impact.

Figure 2:
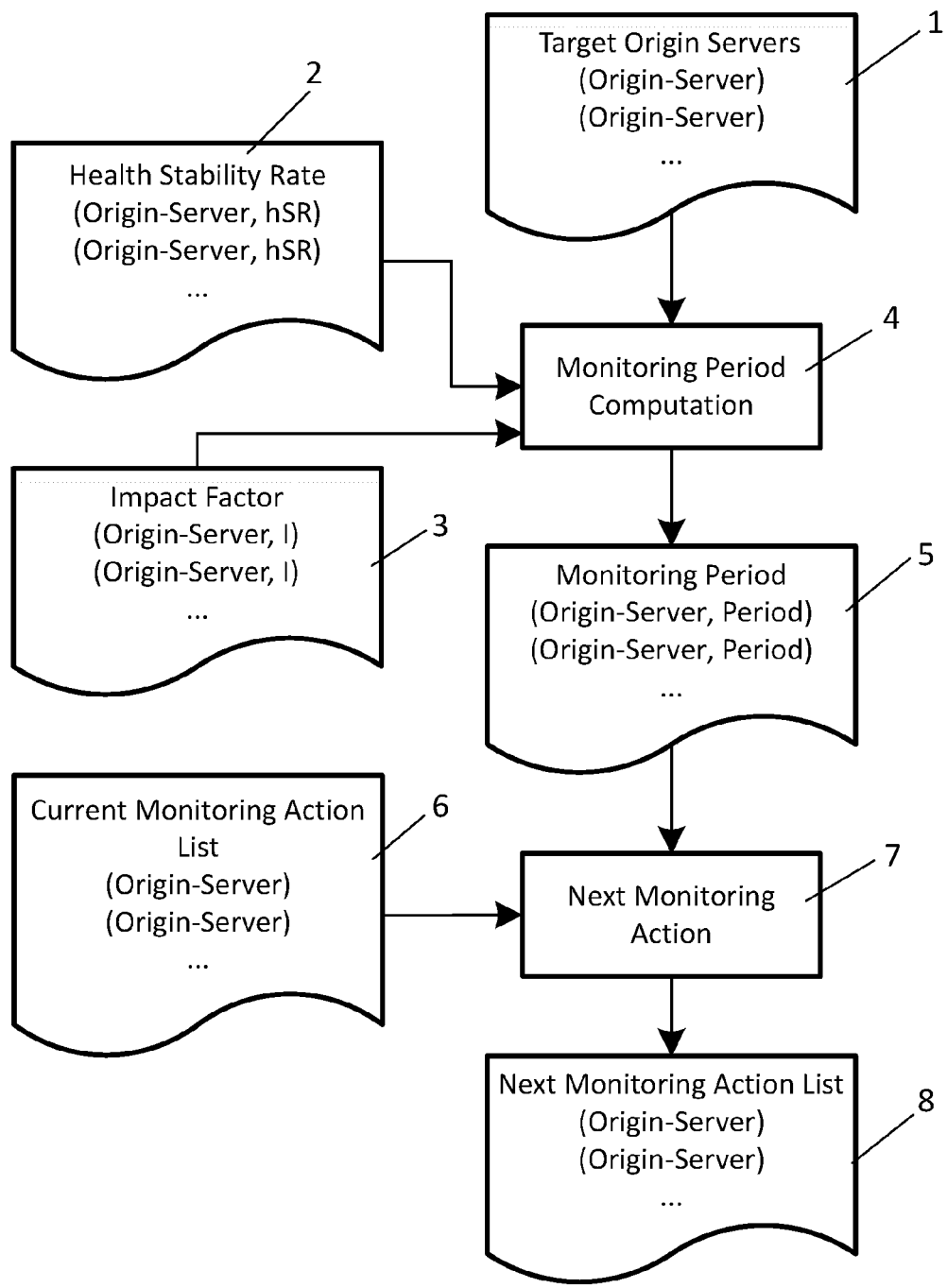
FIG. 2 is a representation of the Area-of-Interest Filtering module used in the present invention.

FIG. 2 shows a detailed design of an Area-of-Interest Filtering (AOIF) module. According to an embodiment, the invention filters the CDN customers by two criterions. Given the list of CDN customers (1), it first filters the customers according to geographical information. This is based on the configuration of the customers. For each customer, it assigns a logical unit (business unit) that defines the location of the end-users. As defined in patent WO 2012/152824 this logical or business unit is an arbitrary geographic area in which the Telefonica's CDN is installed. It may operate in more than one region or arbitrary geographic area. Usually this logical unit may consist of more than one region, and may be composed of one or more ISPs. Every logical unit can specify their routing policies between IP prefixes at a topology server. This topology server provides a topology aware service that has information about the topology of the logical unit in which it operates.

The invention also filters the customer according to the demand of our end-users. The idea is that each node only monitors those customers that are really active in the node (for those origins that caching node is really receiving end-user requests). The implementation of demand-based filtering is shown in the left size of FIG. 2. When the web-caching node wants to create a new request to an origin-server (5), it checks whether we are already tracking this customer (6). If it is not tracking, it creates an entry in an internal data structure to track the new customer (7). The internal data structure is a table indexed by the customer ID and each entry contains a tracking counter. If it is already tracking the customer, it resets the track timer and the tracking counter to zero.

The invention has a track timer per customer that checks periodically whether it is still interested to monitor the customer. Once the tracker timer expired (9), it increases the tracking counter and checks whether it is still interested to the customer (10). To perform this check, it makes sure that the tracker counter is always less than a threshold. By defining the threshold and the tracker timer period, it limits the total amount of time that each customer is tracked. As result of the two filtering process, it generates the list of origin servers that it is interested to monitor.

As explained before, the invention predicts a tenant health trend using both local and global information. The goal of this prediction is to evaluate how changeable is the healthiness of different origin-servers. For each origin-server, a window of historical measurements in form of healthy/unhealthy is kept. Given this historical window as input, the output of this module is a value between 0 and 1, where 0 means that the healthiness of the origin server is unstable. The output of this module is called health-stability rate (hSR).

Given W the size of historical window, it counts the number of health-state changes, C. The hSR is calculated as $hSR=1-C*2/W$.

Figure 3:
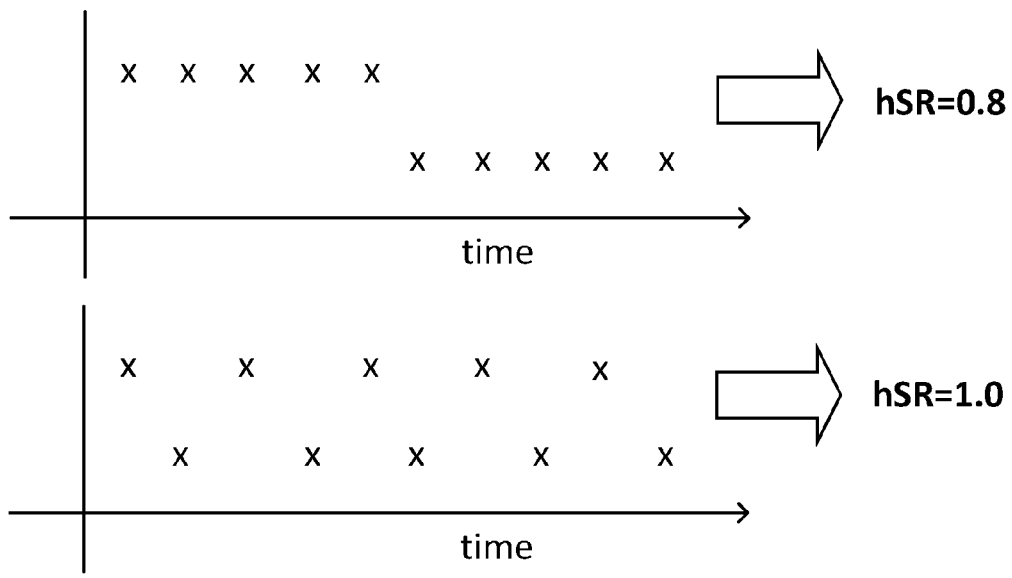
FIG. 3 are some examples calculated from the health-trend prediction module of the present invention.

FIG. 3 show two examples of how hSRT value is calculated given two health history.

Figure 4:
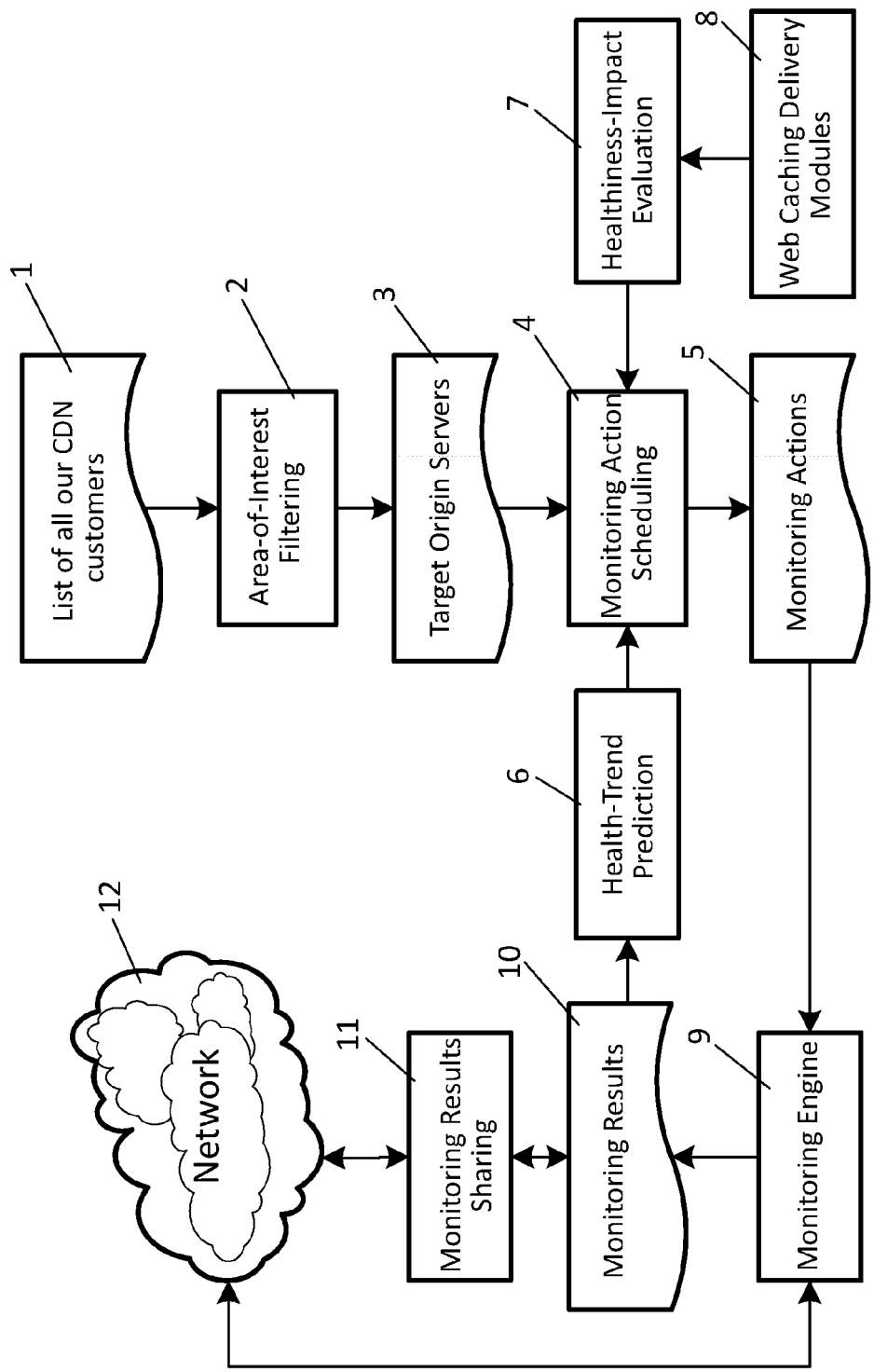
FIG. 4 is a representation of the Monitoring Action Scheduler used in the present invention.

Then, for each target monitoring origin-server, the invention keeps statistics about its utilization. Slots of S seconds are defined. For each slot, it counts the number downloaded objects from each origin-server (n). Then the impact factor l of origin k as $l_k = n_k / \Sigma n_i$ is calculated. The impact factor indicates the ratio of downloaded objects by each origin-server. Once the healthiness impact guiding is calculated, the monitoring action scheduler shown in FIG. 4 calculates the monitoring period. This module takes as input the list of all origin-server to be monitored (1), the value health-stability rate hSR of all origin-servers (2) and all impact factors l (3). As output, it produces the list of monitoring actions (8).

First, the module computes the monitoring period of each target origin-servers (4), by giving more monitoring action to those origin-servers with big impact factor and health un-stability. Once monitoring period (5) is computed in step (4), the step (7) computes the next monitoring actions (8). Step 7 first discards all those origin-servers that are already being monitored (6). Second, it also discards all those origin-servers that time from last monitoring action is less than monitor period. These origin-servers are already recently monitored. Third, it picks m origin-servers with lowest monitoring period as next origin-servers to be monitored. Being m=N−A, where N is to maximum number of parallel monitoring actions and A is the number of ongoing monitor actions.

Finally, the monitoring results obtained are shared. All caching nodes forms an overlay network (random mesh network), where each node is connected with other n caching nodes, called neighboring nodes. The invention uses a standard mechanism to establish the overlay network, inspired by the patent application WO 2012152751 'A Method and a Tracker for Content Delivery through a Content Delivery Network'. Basically, each node contacts periodically with a centralized tracker to download a list of neighboring nodes. From this list, it creates a control channel that exchanges messages. When the number of neighboring nodes falls over a threshold, it contacts again with tracker requesting more nodes.

The result of each monitoring result is a binary value that indicates if an origin-server is healthy or unhealthy. Periodically, each node generates the mentioned bloom filter, BH, of n bits that indicate all healthy origin-servers. It also generates a second bloom filter, BUH, of n bits that indicates all unhealthy origin-servers. Up to k different hash functions are defined to generate the array position of the bloom filter. Each hash-function takes as input the IP address or domain-name of the origin-server to generate a value between 0 to n−1.

The two bloom filters, BH and BUH, are then propagated in the overlay network to neighboring nodes. When a caching-node receives the two bloom filters, it updates the monitoring results. For each target origin server, it checks whether is present in BH. If the origin-server is in BH, then the origin-server is considered healthy. If it is not in BH, it looks BUH. If the origin is in BUH, then it is considered unhealthy. If it is neither there, then it is unknown for the neighboring node.

Some of the advantages achieved when using the proposed health-check system are for instance the reduction of the global monitoring overhead. That's because not all caching nodes will need to monitor all origin-servers. Given an origin-server, the definition of the area-of-interest allows our system to focus monitoring actions on those caching nodes that really receive end-user requests.

Moreover, the different design aspects of the invention provide an effective scalable multi-tenant health-check system for web-caching. Furthermore due to the healthy-check system is not agnostic to the normal behavior of origin-servers, the health-trend prediction will allow monitoring only those tenants that are really required.

The impact of each unhealthy origin-server is constantly evaluated, with the impact-guiding module, so the check system can focus on those origin-servers that are really impacting the final web caching service. For instance, the system can dedicate more resources to those origin-servers that generate dynamic contents.

The coordination together with health trend prediction reduces significantly the total number of health-check actions and increases the scalability of entire health-check system. By targeting the monitoring efforts to origin servers that really affects the web-caching service, the design increases the efficiency of each monitoring action.

Finally, the efficient health information sharing design enables all caching-nodes to share information about huge number of origin-servers. With the bloom filter, each caching node can represent the state of all origin-servers with finite number of bits. Bloom filter is efficient and allow the information sharing mechanism to scale with huge number of origin-servers. By organizing caching nodes in random mesh network, the healthy-check information can be propagated fast in small number of hopes.

The foregoing describes embodiments of the present invention and modifications, obvious to those skilled in the art can be made thereto, without departing from the scope of the present invention.

The invention claimed is:

1. A distributed health-check method for web caching in a telecommunication network, wherein a plurality of web caching nodes are coordinated to monitor a set of origin servers where web content is generated, the method comprising:
   a) associating to each user of said telecommunication network requesting said web content, buckets as logical containers for holding said web content requested;
   b) generating a list containing all of said users of the telecommunication network requesting said web content; and
   c) filtering said set of origin servers so that the filtered servers are grouped in different areas of users' interests;
   d) selecting a limited number of web caching nodes belonging to a specific area of user interest from said different areas of users' interests; and
   e) performing by each one of said limited number of web caching nodes a number of health-checks to said filtered set of servers belonging to the specific area of user interest to download said requested web content.

2. A distributed health-check method according to claim 1, comprising performing said filtering based on geographical information of said users of the telecommunication network.

3. A distributed health-check method according to claim 1, comprising performing said filtering based on demand of said users of the telecommunication network.

4. A distributed health-check method according to claim 3, comprising checking if at least one user of said users of the telecommunication network is tracked by said limited number of caching nodes.

5. A distributed health-check method according to claim 4, comprising tracking said at least one user a limited period of time.

6. A distributed health-check method according to claim 1, characterized in that a Monitoring Action Scheduling module computes a monitoring time period of said filtered set of origin servers.

7. A distributed health-check method according to claim 6, comprising computing said monitoring time period by using information regarding a health-stability rate (hSR) value and information regarding a ratio of downloaded web content of each of said filtered set of origin servers.

8. A distributed health-check method according to claim 7, comprising calculating said hSR value by a Tenant Health-Trend Prediction module using information regarding said filtered set of origin servers or information collected from other plurality of caching nodes.

9. A distributed health-check method according to claim 7, characterized in that a Healthiness Impact Guiding module continuously evaluates said information regarding said downloaded web content ratio.

10. A distributed health-check method according to claim 6, characterized in that said Monitoring Action Scheduling further computes next monitoring actions to be performed on said filtered set of origin servers.

11. A distributed health-check method according to claim 10, characterized in that it comprises performing said next monitoring actions on said filtered set of origin servers that are not already monitored or on said filtered set of origin servers that time from last monitoring is higher than said monitoring time period.

12. A distributed health-check method according to claim 11, comprising sharing by a Monitoring Result Sharing module all of said monitoring actions to some of the caching nodes located near said limited number of caching nodes in said telecommunication network.

13. A distributed health-check method according to claim 11, comprising sharing by a Monitoring Result Sharing module all of said monitoring actions to all of the caching nodes of located near said limited number of caching nodes in said telecommunication network.

14. A distributed health-check method according to claim 12, characterized in that said plurality of caching nodes and said limited number of caching nodes are connected forming an overlay network in said telecommunication network and are coordinated by means of a centralized tracker.

15. A distributed health-check method according to claim 14, characterized in that all of said caching nodes in said overlay network indicate a state of said filtered set of origin servers by using a bloom filter with a finite number of bits.

16. A distributed health-check method according to claim 1, characterized in that said telecommunication network is at least a content delivery network or CDN.

* * * * *